(12) United States Patent
Vijayrao et al.

(10) Patent No.: US 10,878,246 B1
(45) Date of Patent: Dec. 29, 2020

(54) SYSTEMS AND METHODS FOR PERFORMING CLIENT-SIDE CONTENT INFERENCE

(71) Applicant: Facebook, Inc., Menlo Park, CA (US)

(72) Inventors: Narsing Krishna Vijayrao, Santa Clara, CA (US); Jason M. Taylor, Piedmont, CA (US)

(73) Assignee: Facebook, Inc., Menlo Park, CA (US)

( * ) Notice: Subject to any disclaimer, the term of this patent is extended or adjusted under 35 U.S.C. 154(b) by 281 days.

(21) Appl. No.: 16/102,064

(22) Filed: Aug. 13, 2018

(51) Int. Cl.
 G06K 9/00 (2006.01)
 H04L 29/06 (2006.01)
 G06N 20/00 (2019.01)

(52) U.S. Cl.
 CPC ......... *G06K 9/00718* (2013.01); *G06N 20/00* (2019.01); *H04L 63/0245* (2013.01)

(58) Field of Classification Search
 None
 See application file for complete search history.

(56) References Cited

U.S. PATENT DOCUMENTS

2015/0030314 A1* 1/2015 Skarakis ............ G06K 9/00335
386/278

\* cited by examiner

*Primary Examiner* — Soo Jin Park
(74) *Attorney, Agent, or Firm* — FisherBroyles, LLP

(57) ABSTRACT

A method for performing client-side content inference may include (1) receiving a request to upload, from a client-side device to a server-side device, a content item that includes a first sequence of bytes and a second sequence of bytes, (2) identifying a model configured to output a classification for sequences of bytes, (3) using, at the client-side device, the model to derive a first classification for the first sequence, (4) using, at the client-side device, the model to derive a second classification for the second sequence, and (5) uploading, in response to the request, the content item to the server-side device by (a) uploading the first sequence, (b) uploading the first classification substantially contemporaneous with uploading the first sequence, (c) uploading the second sequence, and (d) uploading the second classification substantially contemporaneous with uploading the second sequence. Various other methods, systems, and computer-readable media are also disclosed.

20 Claims, 10 Drawing Sheets

Method 900

US 10,878,246 B1

SYSTEMS AND METHODS FOR PERFORMING CLIENT-SIDE CONTENT INFERENCE

BACKGROUND

Many of today's online systems, such as social networking systems, allow users to store content and/or share content with other users of the online systems. Some online systems may allow users to easily share content with other users by enabling the users to upload or stream the content from their computing devices to the online systems for presentation to the other users. Content provided to an online system by a user (i.e., user-provided content) may be declarative information provided by the user, status updates, images, videos, audio data, text data, any other information the user wishes to share with other users of the online system, or a combination thereof. To ensure that users have a high-quality experience, many online systems maintain content policies that prohibit or control content with objectionable, offensive, suggestive, violent, sensational, illegal, unintelligible, and/or malicious elements. Moreover, to protect content creators and owners, many online systems maintain content policies that prohibit or control content that is provided to the online system by someone other than the content's creator or owner.

To police their content policies, many online systems use human analysts, as well as artificial intelligence, to detect and filter objectionable content. Many of today's most popular online systems receive thousands to billions of pieces of content from their users every day, which may require the management of large amounts of human and computational resources to properly detect and filter all objectionable content. In addition, many online systems now allow users to share or exchange live content (e.g., video streams, audio streams, etc.), which may make real-time human policing of content policies difficult or impossible. The instant disclosure, therefore, identifies and addresses a need for systems and methods for efficiently and effectively performing content inference, especially for enabling real-time detection and filtering of objectionable content.

SUMMARY

As will be described in greater detail below, the instant disclosure describes various systems and methods for performing client-side content inference. In one example, a method for performing client-side content inference may include (1) receiving a request to upload, from a client-side computing device to one or more server-side computing devices, a content item that includes a first sequence of bytes and a second sequence of bytes, (2) identifying, at the client-side computing device, at least one model configured to output one or more classifications for sequences of bytes in the content item, (3) using, at the client-side computing device, the at least one model to derive a first classification for the first sequence, (4) using, at the client-side computing device, the at least one model to derive a second classification for the second sequence, and (5) uploading, in response to the request, the content item from the client-side computing device to the one or more server-side computing devices by (a) uploading the first sequence, (b) uploading the first classification substantially contemporaneous with uploading the first sequence, (c) uploading the second sequence, and (d) uploading the second classification substantially contemporaneous with uploading the second sequence.

In some examples, the second sequence and the second classification may be uploaded from the client-side computing device to the one or more server-side computing devices after the first sequence and the first classification are uploaded from the client-side computing device to the one or more server-side computing devices. In some embodiments, the content item may be a video file recorded and stored at the client-side computing device, the first sequence may be one or more frames of the video file, and the second sequence may be one or more additional frames of the video file. In other embodiments, the content item may be a live video stream being captured by and streamed from the client-side computing device, the first sequence may be one or more frames of the live video stream, and the second sequence may be one or more additional frames of the live video stream. In some embodiments, the content item may be an audio file or a live audio stream.

In some embodiments, the first classification may indicate that the first sequence contains objectionable content, and the second classification may indicate that the second sequence does not contain objectionable content. In at least one example, the first sequence and the second sequence may be overlapping sequences, the first classification may indicate that the first sequence contains an element of a known type, and the second classification may indicate that the second sequence contains the element in an objectionable context.

In some examples, the method may further include (1) identifying, at the one or more server-side computing devices, a content policy that (a) maps the first classification to a first action to be performed when any sequence of bytes has been classified with the first classification and (b) maps the second classification to a second action to be performed when any sequence of bytes has been classified with the second classification, (2) receiving, at the one or more server-side computing devices, the first sequence, (3) receiving, at the one or more server-side computing devices, the first classification, (4) performing, in response to receiving the first classification, the first action, (5) receiving, at the one or more server-side computing devices, the second sequence, (6) receiving, at the one or more server-side computing devices, the second classification, and (7) performing, in response to receiving the second classification, the second action. In at least one example, the first security action may include transmitting any sequence of bytes that has been classified with the first classification to a first additional computing device, and the second security action may include transmitting any sequence of bytes that has been classified with the second classification to a second additional computing device.

In some examples, the step of uploading the first classification may include (1) uploading a first indicator of the first classification substantially contemporaneous with uploading the first byte of the first sequence and (2) uploading a second indicator of the first classification substantially contemporaneous with uploading the last byte of the first sequence. In at least one example, the content item may further include a third sequence of bytes, the method may further include using, at the client-side computing device, the at least one model to derive a third classification for the third sequence, and the step of uploading the content item from the client-side computing device to the one or more server-side computing devices may further include refraining, at the client-side computing device based at least in part on the third classification of the third sequence, from uploading the third sequence to the one or more server-side computing devices.

In some examples, the method may further include identifying, at the client-side computing device, an upload policy that maps the first classification to a first action to be performed at the client-side computing device when any sequence of bytes has been classified with the first classification and maps the second classification to a second action to be performed at the client-side computing device when any sequence of bytes has been classified with the second classification. In at least one example, the first action may include uploading any sequence of bytes that has been classified with the first classification to a first one of the one or more server-side computing devices, and the second action may include uploading any sequence of bytes that has been classified with the second classification to a second one of the one or more server-side computing devices.

In addition, a corresponding system may include one or more server-side computing devices and a client-side software agent stored in physical memory of a client-side computing device and executed by a physical processor of the client-side computing device. In some examples, the client-side software agent may include several modules stored in memory, including (1) a receiving module that receives a request to upload, from the client-side computing device to the one or more server-side computing devices, a content item that includes a first sequence of bytes and a second sequence of bytes, (2) an identifying module that identifies, at the client-side computing device, at least one model configured to output one or more classifications for sequences of bytes in the content item, (3) a classifying module that uses, at the client-side computing device, the at least one model to (a) derive a first classification for the first sequence and (b) derive a second classification for the second sequence, and (4) an uploading module that uploads, in response to the request, the content item from the client-side computing device to the one or more server-side computing devices by (a) uploading the first sequence, (b) uploading the first classification substantially contemporaneous with uploading the first sequence, (c) uploading the second sequence, and (d) uploading the second classification substantially contemporaneous with uploading the second sequence.

In some examples, the uploading module may upload the second sequence and the second classification from the client-side computing device to the one or more server-side computing devices after uploading the first sequence and the first classification from the client-side computing device to the one or more server-side computing devices. In certain examples, the one or more server-side computing devices may include a content-management module, stored in physical memory of the one or more server-side computing devices and executed by a physical processor of the one or more server-side computing devices, that (1) identifies, at the one or more server-side computing devices, a content policy that maps the first classification to a first action to be performed when any sequence of bytes has been classified with the first classification and maps the second classification to a second action to be performed when any sequence of bytes has been classified with the second classification, (2) receives, at the one or more server-side computing devices, the first sequence, (3) receives, at the one or more server-side computing devices, the first classification, (4) performs, in response to receiving the first classification, the first action, (5) receives, at the one or more server-side computing devices, the second sequence, (6) receives, at the one or more server-side computing devices, the second classification, and (7) performs, in response to receiving the second classification, the second action. In some examples, the first security action may include transmitting any sequence of bytes that has been classified with the first classification to a first additional computing device, and the second security action may include transmitting any sequence of bytes that has been classified with the second classification to a second additional computing device.

In some examples, the uploading module may upload the first classification from the client-side computing device to the one or more server-side computing devices by (1) uploading a first indicator of the first classification substantially contemporaneous with uploading the first byte of the first sequence and (2) uploading a second indicator of the first classification substantially contemporaneous with uploading the last byte of the first sequence. In at least one example, the content item may further include a third sequence of bytes, the classifying module may further use, at the client-side computing device, the at least one model to derive a third classification for the third sequence, and the uploading module may upload the content item from the client-side computing device to the one or more server-side computing devices by refraining, at the client-side computing device based at least in part on the third classification of the third sequence, from uploading the third sequence to the one or more server-side computing devices.

In some examples, the first sequence and the second sequence may be overlapping sequences, the first classification may indicate that the first sequence contains an element of a known type, and the second classification indicates that the second sequence contains the element in an objectionable context. In these examples, the uploading module may upload the first classification and the second classification by (1) uploading a first indicator of the first classification substantially contemporaneous with uploading the first byte of the first sequence, (2) uploading a second indicator of the second classification substantially contemporaneous with uploading the first byte of the second sequence, (3) uploading a third indicator of the first classification substantially contemporaneous with uploading the last byte of the first sequence, and (4) uploading a fourth indicator of the second classification substantially contemporaneous with uploading the last byte of the second sequence.

In some examples, the above-described method may be encoded as computer-readable instructions on a computer-readable medium. For example, a computer-readable medium may include one or more computer-executable instructions that, when executed by at least one processor of a client-side computing device, may cause the computing device to (1) receive a request to upload, from a client-side computing device to one or more server-side computing devices, a content item that includes a first sequence of bytes and a second sequence of bytes, (2) identify, at the client-side computing device, at least one model configured to output one or more classifications for sequences of bytes in the content item, (3) use, at the client-side computing device, the at least one model to derive a first classification for the first sequence, (4) use, at the client-side computing device, the at least one model to derive a second classification for the second sequence, and (5) upload, in response to the request, the content item from the client-side computing device to the one or more server-side computing devices by (a) uploading the first sequence, (b) uploading the first classification substantially contemporaneous with uploading the first sequence, (c) uploading the second sequence, and (d) uploading the second classification substantially contemporaneous with uploading the second sequence.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
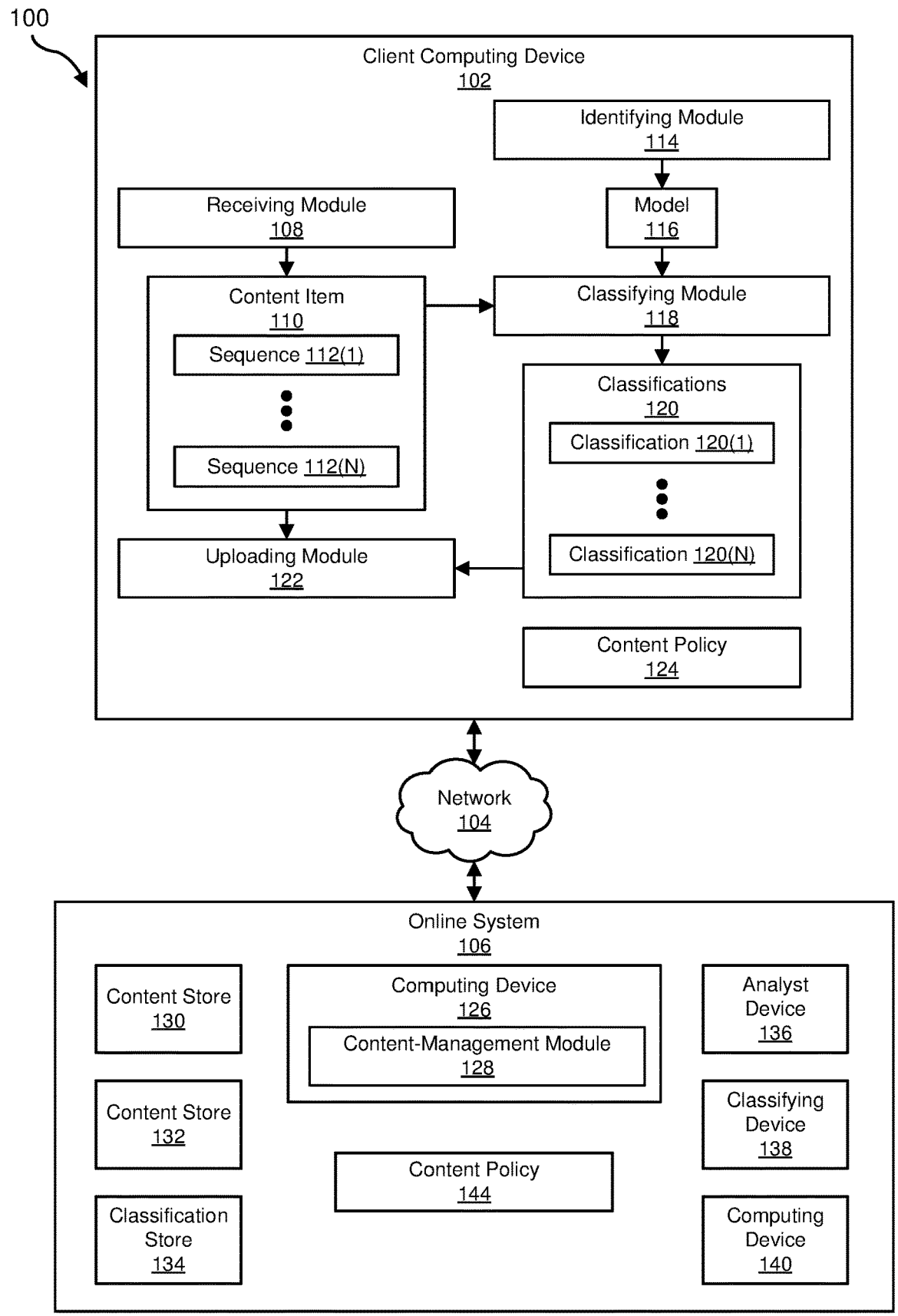
FIG. 1 is a block diagram of an exemplary system environment in which an exemplary online system operates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing client-side content inference. As will be explained in greater detail below, by classifying content on client-side devices rather than server-side devices, the systems and methods disclosed herein may reduce the amount of server-side resources needed to perform content classification. Moreover, by performing real-time content classification as part of uploading or streaming content from client-side computing devices to server-side computing devices, the systems and methods disclosed herein may enable the server-side computing devices to receive the content and the content's classifications simultaneously, which may enable such things as real-time policing of content policies, real-time detection of objectionable content, and/or other real-time content-management tasks. In addition, the systems and methods described herein may improve the functioning of server-side computing devices by offloading classification tasks to client-side computing devices. These systems and methods may also improve the field of content hosting, especially live content hosting, by enabling server-side computing devices to receive classifications for content items simultaneous with receiving the content items themselves, which may enable the server-side computing devices to react immediately to the content items without needing to first classify the content items. Embodiments of the instant disclosure may also provide various other advantages and features, as discussed in greater detail below.

Figure 2:
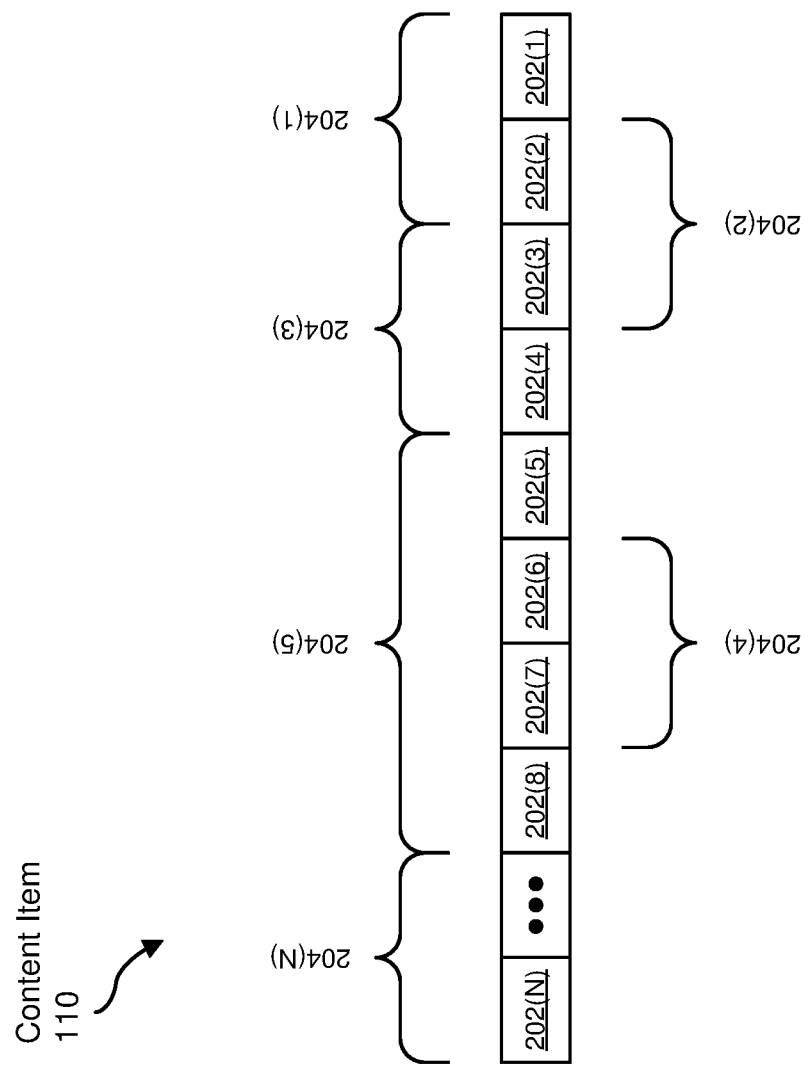
FIG. 2 is a block diagram of an exemplary content item.

The following will provide, with reference to FIGS. 1 and 2, detailed descriptions of an example system for performing client-side content inference. Detailed descriptions of computer-implemented methods and corresponding data flows for performing client-side content inference will be provided in connection with FIGS. 3-8. Detailed descriptions of computer-implemented methods for performing various real-time actions in response to content classifications will also be provided in connection with FIGS. 9-10.

FIG. 1 is a block diagram of an exemplary system environment 100 in which an online system 106 operates. As illustrated in this figure, system environment 100 may include a client computing device 102. In this example, client computing device 102 generally represents a computing device of a user of online system 106 that is capable of transmitting content items (e.g., content item 110) to online system 106 via network 104 (e.g., the Internet). Content item 110 generally represents any instance of content or data that may be uploaded, transmitted, or posted to an online system by a user of the online system and/or that may be shown to or consumed by other users of the online system. In some examples, content item 110 may represent one or more images, one or more videos, audio data, text data, one or more files, any other information a user wishes to store at an online system and/or share with other users of the online system, or a combination thereof. In some examples, content item 110 may represent content that was captured via client computing device 102 and/or stored on client computing device 102. As such, client computing device 102 may have originated content item 110. Alternatively, content item 110 may represent data that was downloaded to or made accessible to client computing device 102. In some examples, content item 110 may represent a live stream of data being captured by client computing device 102 (e.g., a live video stream or a live audio stream).

As shown in FIG. 1, content item 110 may include sequences of bytes 112(1)-(N). Sequences of bytes 112(1)-(N) may each represent a divisible portion of content item 110 (e.g., one or more frames from a video file or stream, one or more clips from an audio file or stream, one or more characters or sentences from a text file, or one or more sections of a single image). In some examples, sequences of bytes 112(1)-(N) may represent every sequence of bytes making up content item 110. For example, sequences of bytes 112(1)-(N) may respectively represent sequences of bytes 202(1)-(N) illustrated in FIG. 2. Alternatively, sequences of bytes 112(1)-(N) may represent overlapping sequences of bytes extracted from content item 110. For example, sequences of bytes 112(1)-(N) may respectively represent sequences of bytes 204(1)-(N) illustrated in FIG.

2. In some examples, sequences of bytes 112(1)-(N) may represent a subset of the sequences of bytes of content item 110 that have been sampled from content item 110.

As shown in FIG. 1, client computing device 102 may include one or more modules for performing one or more tasks. For example, and as will be explained in greater detail below, client computing device 102 may include a receiving module 108 that receives requests to upload content items from client computing device 102 to online system 106. Client computing device 102 may also include an identifying module 114 that identifies, at client computing device 102, at least one model (e.g., model 116) configured to output one or more classifications 120 for sequences of bytes 112(1)-(N) in content item 110. Model 116 generally represents any machine-learning model, algorithm, heuristic, data, or combination thereof, that may be used to calculate, predict, or infer a classification (e.g., a label, a class, a score, etc.) for sequences of bytes of a content item. Examples of models include, without limitation, decision trees (e.g., boosting decision trees), neural networks (e.g., a deep convolutional neural network), deep-learning models, support vector machines, linear classifiers, non-linear classifiers, perceptrons, naive Bayes classifiers, any other machine-learning or classification techniques or algorithms, or any combination thereof.

Once trained, model 116 may be capable of identifying and classifying various elements contained within a sequence of bytes of a content item. For example, model 116 may be capable of detecting and classifying various people, faces, places, objects, spoken phrases, spoken words, facial expressions, topics, contexts, and/or a variety of other elements within a sequence of bytes. In some examples, model 116 may be capable of identifying and classifying various forms of objectionable content such as misleading, disruptive, sensational, spammy, objectionable, offensive, suggestive, violent, dangerous, illegal, unintelligible, malicious, and/or other types of objectionable content. For example, model 116 may be capable of identifying and classifying various objectionable elements within a sequence of bytes of a content item. For example, model 116 may be capable of identifying and classifying various objects within a sequence of bytes of a content item that may in some circumstances be considered objectionable (e.g., weapons, drugs, etc.). Additionally or alternatively, model 116 may be capable of identifying and classifying various objectionable contexts within a sequence of bytes of a content item in which objects that may in some circumstances be considered benign may actually be objectionable (e.g., a gun pointed at a person rather than at a practice target or a phrase spoken in a threatening rather than a joking manner).

Returning to FIG. 1, client computing device 102 may further include a classifying module 118 that uses, at client computing device 102, one or more models to derive one or more classifications for each of sequences of bytes 112(1)-(N). Client computing device 102 may also include an uploading module 122 that uploads content item 110 from client computing device 102 to online system 106 by uploading sequences of bytes 112(1)-(N) and classifications 120. In some examples, receiving module 108, identifying module 114, classifying module 118, and uploading module 122 may represent some or all of a client-side software agent or inference engine installed and/or executing on client computing device 102. In some examples, client-side computing device 102 may include one or more content policies, such as content policy 124, that may define certain actions to be performed at client computing device 102 when sequences of bytes 112(1)-(N) of content item 110 are assigned associated classifications. For example, content policy 124 may specify that sequences of bytes that have been classified as objectionable should not be transmitted to online system 106.

Online system 106 may generally represent any system that receives content items from or for its users via the Internet and stores and/or hosts these content items for its users. Examples of online system 106 include, without limitation, social-networking systems, social-media systems, photo-sharing systems, video-sharing systems, live-streaming systems, email systems, file-hosting systems, file-backup systems, news-aggregation systems, and messaging systems. As shown in FIG. 1, online system 106 may include one or more server-side computing devices for processing content items, such as computing device 126, analyst device 136, classifying device 138, and/or computing device 140. In this example, computing device 126 may include a content-management module 128 that performs various real-time actions in response to receiving content items with certain classifications. Online system 106 may include one or more server-side storage systems for storing content items and their classifications, such as content store 130, content store 132, and classification store 134. In some examples, content store 130 may represent a storage system designated for storing content items that have certain classifications (e.g., benign), and content store 132 may represent a storage system designated for storing content items that have certain other classifications (e.g., objectionable). In some examples, online system 106 may include one or more content policies, such as content policy 144, that may define certain actions to be performed at a server-side computing device when sequences of bytes of content items are assigned associated classifications.

Figure 3:
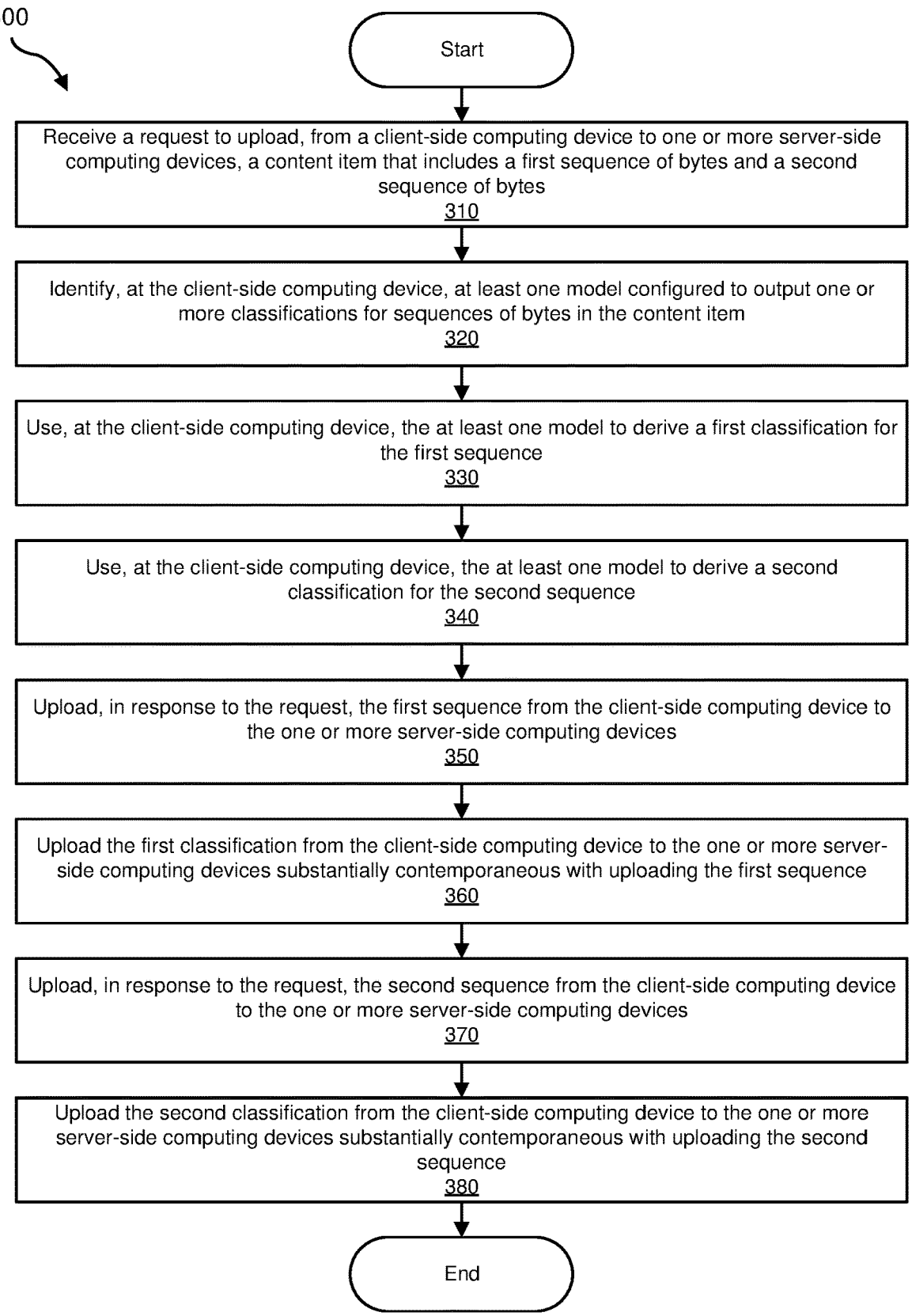
FIG. 3 is a flow diagram of an exemplary method for performing client-side content inference.

FIG. 3 is a flow diagram of an example computer-implemented method 300 for performing client-side content inference. The steps shown in FIG. 3 may be performed by any suitable computer-executable code and/or computing system, including client computing device 102 in FIG. 1. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive a request to upload, from a client-side computing device to one or more server-side computing devices, a content item that includes a first sequence of bytes and a second sequence of bytes. Using FIG. 1 as an example, receiving module 108 may receive a request to upload content item 110 to online system 106.

The systems described herein may receive requests to upload content items to an online system in a variety of contexts. For example, receiving module 108 may receive a request from a user of client computing device 102 to upload a file stored to client computing device 102 to online system 106. Additionally or alternatively, receiving module 108 may receive a request from a user of online system 106 to initiate a live video or audio stream via client computing device 102 that will be stored to online system 106 and/or relayed by online system 106 to one or more additional users of online system 106.

At step 320, one or more of the systems described herein may identify, at the client-side computing device, at least one model configured to output one or more classifications for sequences of bytes in the content item. Using FIG. 1 as an example, identifying module 114 may identify model 116. The models described herein may be trained to perform client-side content inference in any suitable manner.

At step 330, one or more of the systems described herein may use, at the client-side computing device, the at least one model to derive a first classification for the first sequence. Using FIG. 1 as an example, classifying module 118 may use model 116 to derive classification 120(1) for sequence of bytes 112(1). At step 340, one or more of the systems described herein may use, at the client-side computing device, the at least one model to derive a second classification for the second sequence. Using FIG. 1 as an example, classifying module 118 may use model 116 to derive classification 120(2) for sequence of bytes 112(2).

The systems described herein may derive classifications for sequences of bytes of a content item in any suitable manner. In some examples, the systems described herein may derive classifications for sequences of bytes of a content item in a serial manner. Using data flow 400 illustrated in FIG. 4 as an example, classifying module 118 may serially derive classifications 120(1)-(N) for sequences of bytes 112(1)-(N), respectively. In this example, classifying module 118 may first apply model 116 to sequence of bytes 112(1) to derive classification 120(1). After deriving classification 120(1) for sequence of bytes 112(1), classifying module 118 may then apply model 116 to sequence of bytes 112(2) to derive classification 120(2). Classifying module 118 may continue to apply model 116 to sequence of bytes 112(3)-(N) to derive classifications 120(3)-(N) in a similar fashion.

In general, the systems described herein may derive classifications for sequences of bytes of a content item substantially contemporaneous with uploading the sequences of bytes. In some examples, classifying module 118 may derive a classification for a sequence of bytes immediately before the sequence of bytes is uploaded, as the sequence of bytes is uploaded, or immediately after the sequence of bytes is uploaded. Using FIG. 4 as an example, classifying module 118 may derive classification 120(1) for sequence of bytes 112(1) immediately before uploading module 122 uploads sequence of bytes 112(1) to computing device 126, as uploading module 122 uploads sequence of bytes 112(1) to computing device 126, or immediately after uploading module 122 uploads sequence of bytes 112(1) to computing device 126.

At step 350, one or more of the systems described herein may upload, in response to the request received at step 310, the first sequence from the client-side computing device to the one or more server-side computing devices. Using FIG. 1 as an example, uploading module 122 may upload sequence of bytes 112(1) to computing device 126 of online system 106. At step 360, one or more of the systems described herein may upload the first classification from the client-side computing device to the one or more server-side computing devices substantially contemporaneous with uploading the first sequence. Using FIG. 1 as an example, uploading module 122 may upload classification 120(1) to computing device 126 of online system 106 substantially contemporaneous with uploading sequence of bytes 112(1) to computing device 126. At step 370, one or more of the systems described herein may upload, in response to the request, the second sequence from the client-side computing device to the one or more server-side computing devices. Using FIG. 1 as an example, uploading module 122 may upload sequence of bytes 112(2) to computing device 126 of online system 106. At step 380, one or more of the systems described herein may upload the second classification from the client-side computing device to the one or more server-side computing devices substantially contemporaneous with uploading the second sequence. Using FIG. 1 as an example, uploading module 122 may upload classification 120(2) to computing device 126 of online system 106 substantially contemporaneous with uploading sequence of bytes 112(2) to computing device 126.

The systems described herein may upload a classification of a sequence of bytes substantially contemporaneous with uploading the sequence of bytes in a variety of ways. For example, uploading module 122 may upload a classification of a sequence of bytes immediately after uploading the sequence of bytes. Using FIG. 4 as an example, uploading module 122 may upload classifications 120(1)-(N) immediately after uploading sequences of bytes 112(1)-(N), respectively. In other examples, uploading module 122 may upload a classification of a sequence of bytes immediately before uploading the sequence of bytes. Additionally or alternatively, uploading module 122 may upload a classification of a sequence of bytes while also uploading the sequence of bytes. Using data flow 500 in FIG. 5 as an example, uploading module 122 may upload classifications 120(1)-(N) at the same time as sequences of bytes 112(1)-(N), respectively.

Figure 4:
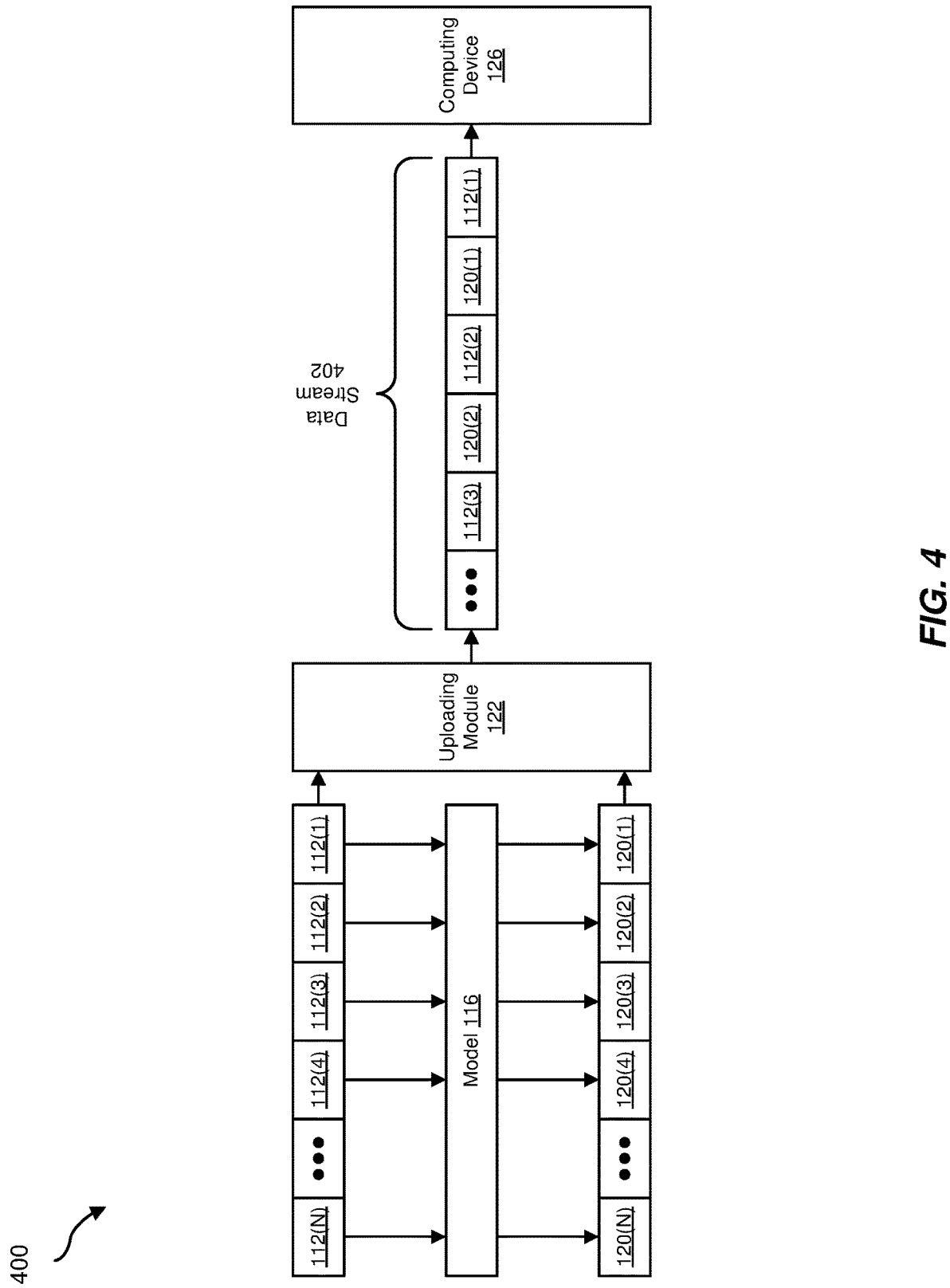
FIG. 4 is a flow diagram of an exemplary data stream for transmitting content items and content classifications from a client-side computing device to a server-side computing device.
Figure 5:
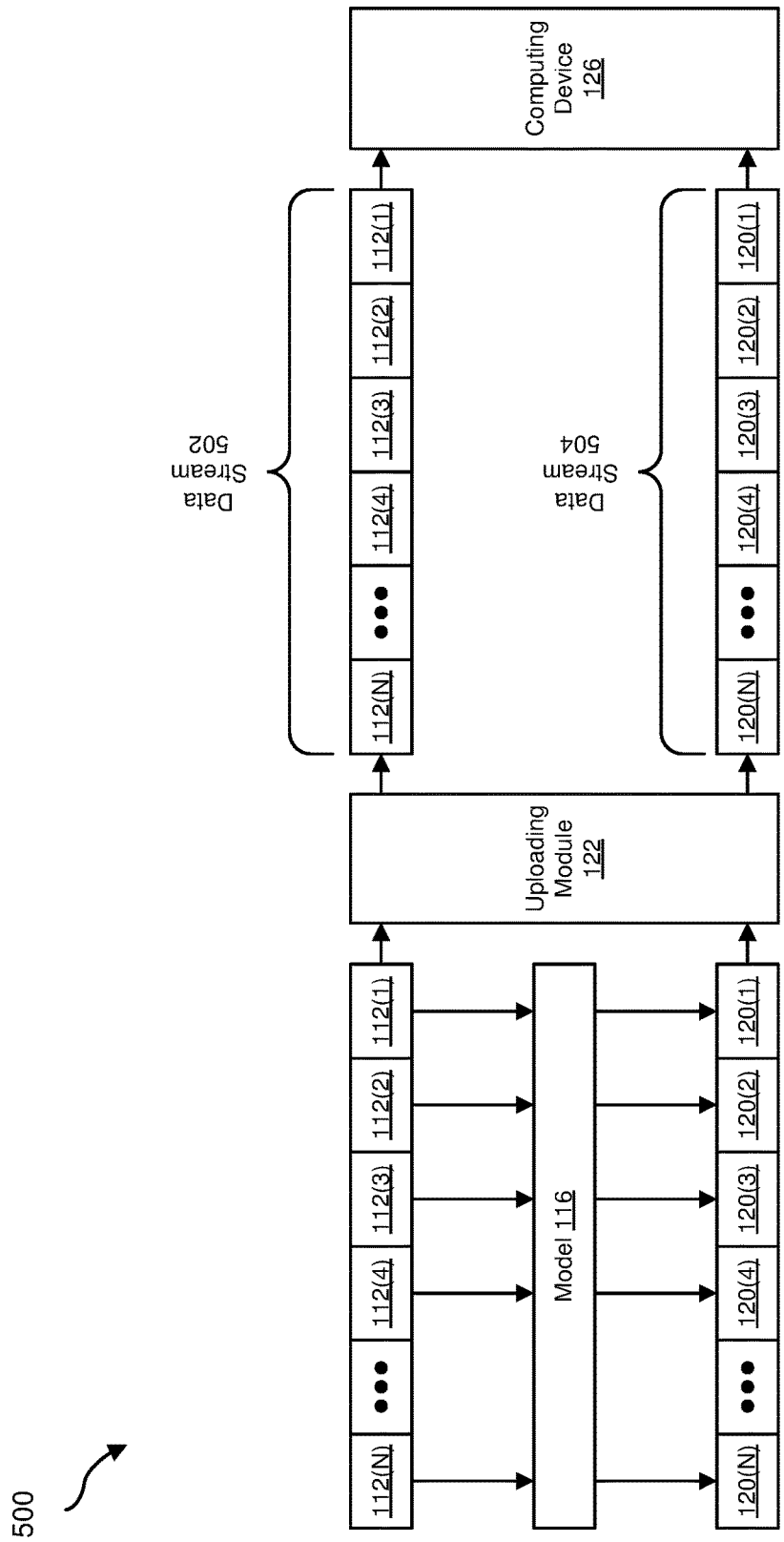
FIG. 5 is a flow diagram of exemplary data streams for transmitting content items and content classifications from a client-side computing device to a server-side computing device.
Figure 6:
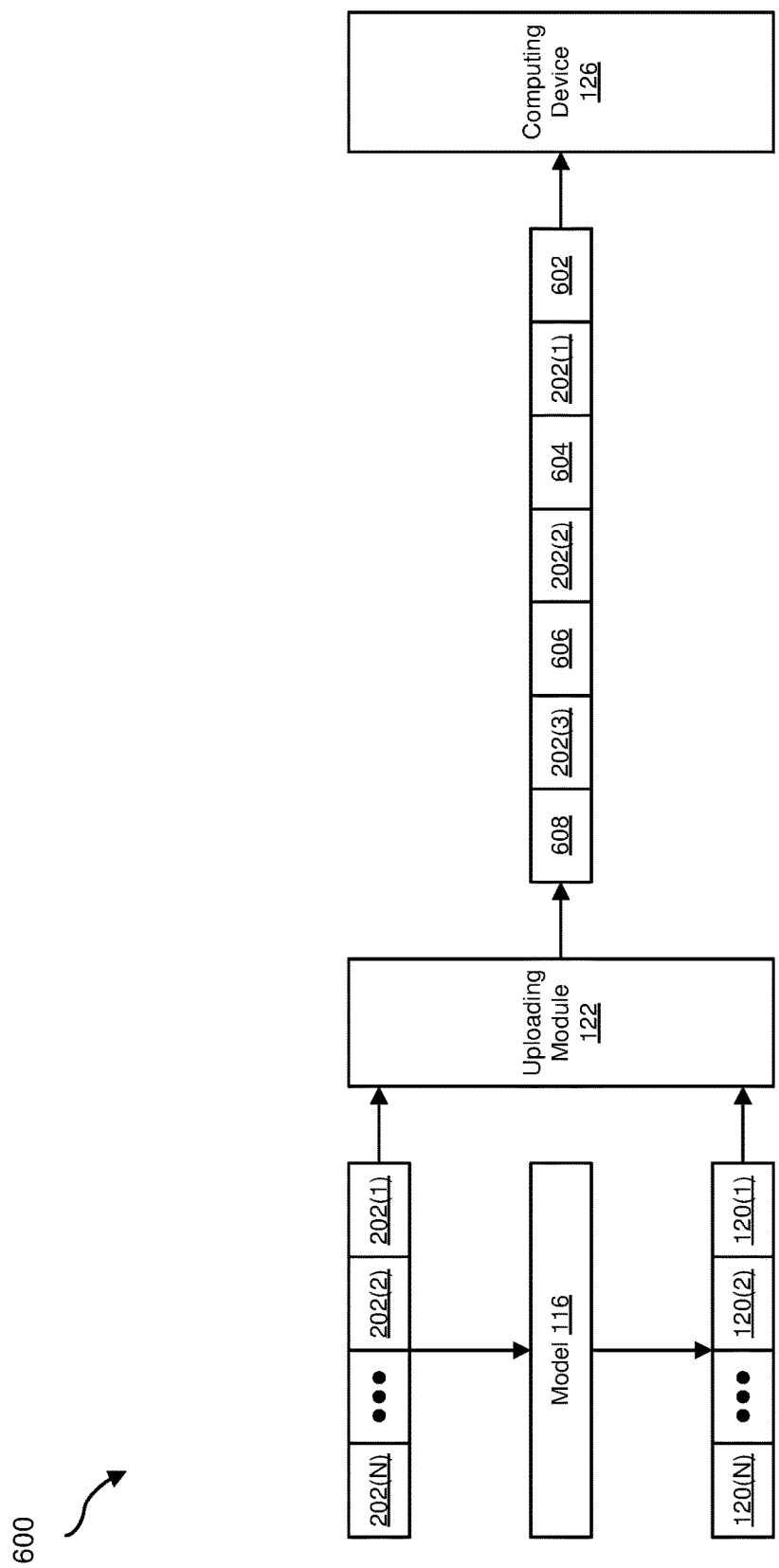
FIG. 6 is a flow diagram of an additional exemplary data stream for transmitting content items and content classifications from a client-side computing device to a server-side computing device.

In some examples, the systems described herein may upload sequences of bytes and their associated classifications via a single serial data stream. For example, as illustrated in FIG. 4, uploading module 122 may upload sequences of bytes 112(1)-(N) and classifications 120(1)-(N) via a single data stream 402. Alternatively, the systems described herein may upload sequences of bytes and their associated classifications via parallel data streams. For example, as illustrated by data flow 500 in FIG. 5, uploading module 122 may upload sequences of bytes 112(1)-(N) to computing device 126 via data stream 502 and may upload classifications 120(1)-(N) to computing device 126 via a data stream 504.

The systems described herein may associate classifications with sequences of bytes in any suitable manner. In some examples, the systems described herein may order the uploading of sequences of bytes and classifications such that the ordering of sequences of bytes and classifications indicates their association. For example, uploading module 122 may upload each classification of a sequence of bytes immediately before or immediately after uploading the sequence of bytes. In other examples, uploading module 122 may associate a classification with a sequence of bytes by uploading an indicator (e.g., a flag or tag) of the classification substantially contemporaneous with uploading the first byte of the sequence and uploading a second indicator of the classification substantially contemporaneous with uploading the last byte of the sequence. Using data flow 600 in FIG. 6 as an example, uploading module 122 may upload an indicator 602 representing classification 120(1) of sequence of bytes 204(1) before uploading the first byte of sequence of bytes 204(1), an indicator 604 representing classification 120(2) of sequence of bytes 204(2) before uploading the first byte of sequence of bytes 204(2), an indicator 606 representing classification 120(1) after uploading the last byte of sequence of bytes 204(1), and an indicator 608 representing classification 120(2) after uploading the last byte of sequence of bytes 204(2).

Figure 7:
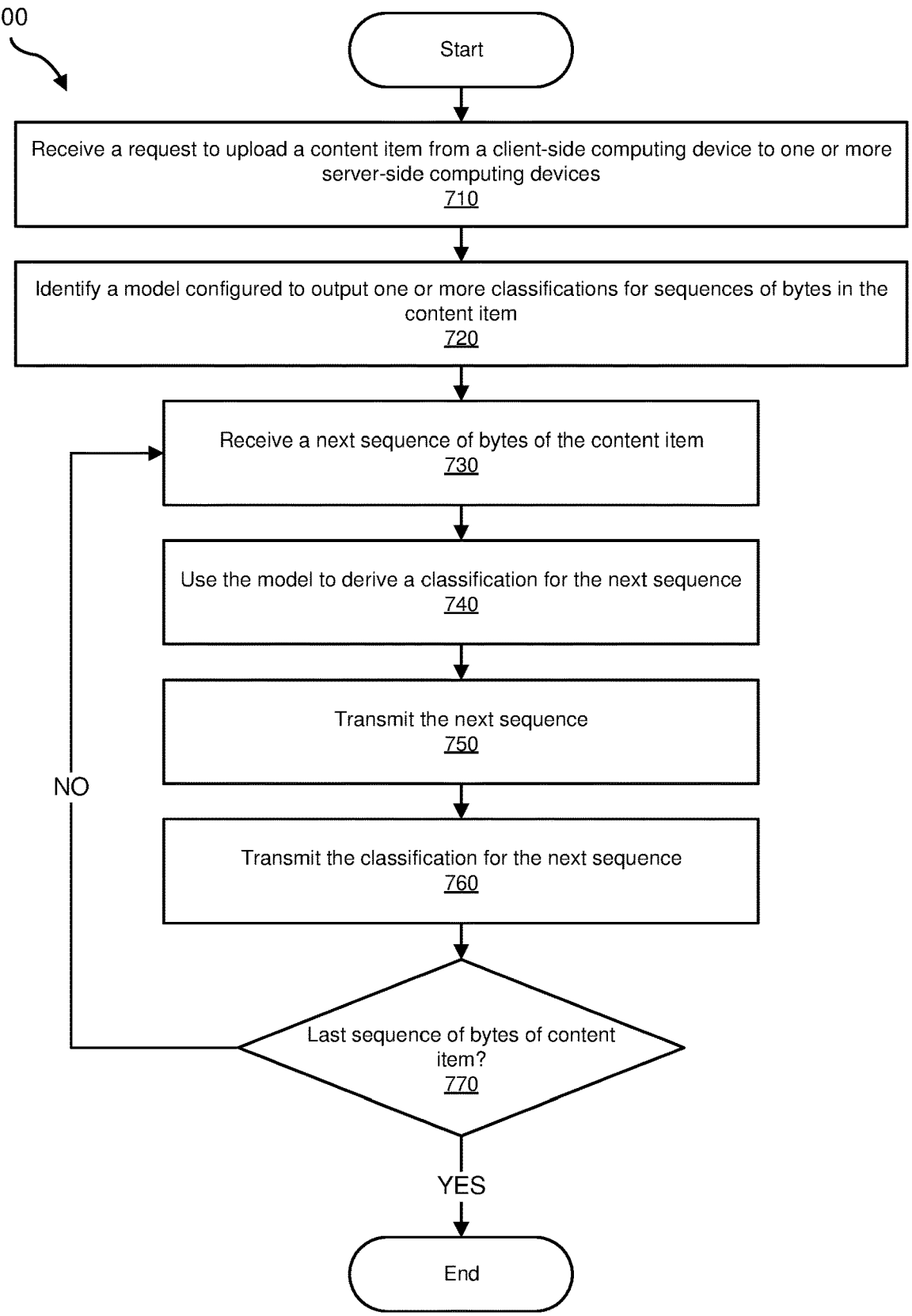
FIG. 7 is a flow diagram of an additional exemplary method for performing client-side content inference.

In some examples, the systems and methods disclosed herein may serially classify and upload the sequences of bytes of a content item. FIG. 7 is a flow diagram of an example computer-implemented method 700 for serially classifying and uploading the sequences of bytes of a content item. The steps shown in FIG. 7 may be performed by any suitable computer-executable code and/or computing system, including client computing device 102 in FIG. 1. In one example, each of the steps shown in FIG. 7 may represent an algorithm whose structure includes and/or is represented by multiple sub-steps, examples of which will be provided in greater detail below.

At step 710, one or more of the systems described herein may receive a request to upload a content item from a client-side computing device to one or more server-side computing devices. At step 720, one or more of the systems described herein may identify a model configured to output one or more classifications for sequences of bytes in the content item. At step 730, one or more of the systems described herein may receive a next sequence of bytes of the content item. At step 740, one or more of the systems described herein may use the model to derive a classification for the next sequence. At step 750, one or more of the systems described herein may transmit the next sequence from the client-side computing device to the one or more server-side computing devices. At step 760, one or more of the systems described herein may transmit the classification for the next sequence from the client-side computing device to the one or more server-side computing devices. At step 770, one or more of the systems described herein may determine if the last sequence of bytes of content item has been classified and uploaded from the client-side computing device to the one or more server-side computing devices. If the content item contains any additional sequences of bytes, execution of method 700 may continue at step 730. Alternatively, if the content item contains no additional sequences of bytes, execution of method 700 may terminate.

Figure 8:
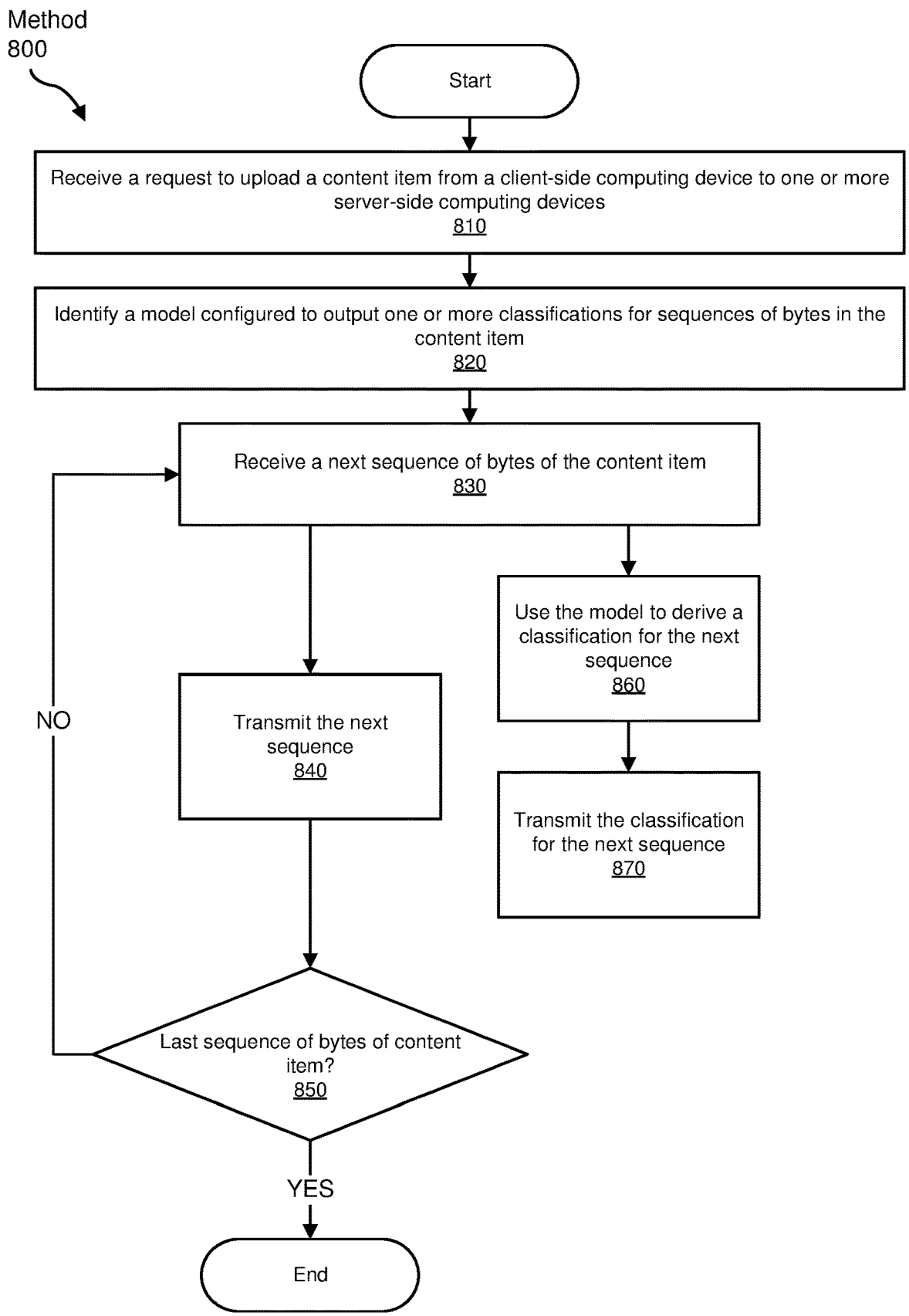
FIG. 8 is a flow diagram of an additional exemplary method for performing client-side content inference.

In some examples, the systems and methods disclosed herein may classify the sequences of bytes of a content item in parallel with uploading the sequences of bytes of the content item. FIG. 8 is a flow diagram of an example computer-implemented method 800 for classifying the sequences of bytes of a content item in parallel with uploading the sequences of bytes of the content item. The steps shown in FIG. 8 may be performed by any suitable computer-executable code and/or computing system, including client computing device 102 in FIG. 1. In one example, each of the steps shown in FIG. 8 may represent an algorithm whose structure includes and/or is represented by multiple sub-steps, examples of which will be provided in greater detail below.

At step 810, one or more of the systems described herein may receive a request to upload a content item from a client-side computing device to one or more server-side computing devices. At step 820, one or more of the systems described herein may identify a model configured to output one or more classifications for sequences of bytes in the content item. At step 830, one or more of the systems described herein may receive a next sequence of bytes of the content item. At step 840, one or more of the systems described herein may transmit the next sequence from the client-side computing device to the one or more server-side computing devices. At step 850, one or more of the systems described herein may determine if the last sequence of bytes of content item has been uploaded from the client-side computing device to the one or more server-side computing devices. If the content item contains any additional sequences of bytes, execution of method 800 may continue at step 830. Alternatively, if the content item contains no additional sequences of bytes, execution of method 800 may terminate. At step 860, one or more of the systems described herein may use the model to derive a classification for the next sequence. At step 870, one or more of the systems described herein may transmit the classification for the next sequence from the client-side computing device to the one or more server-side computing devices. In this example, steps 860 and 870 may be performed in parallel with step 840.

Figure 9:
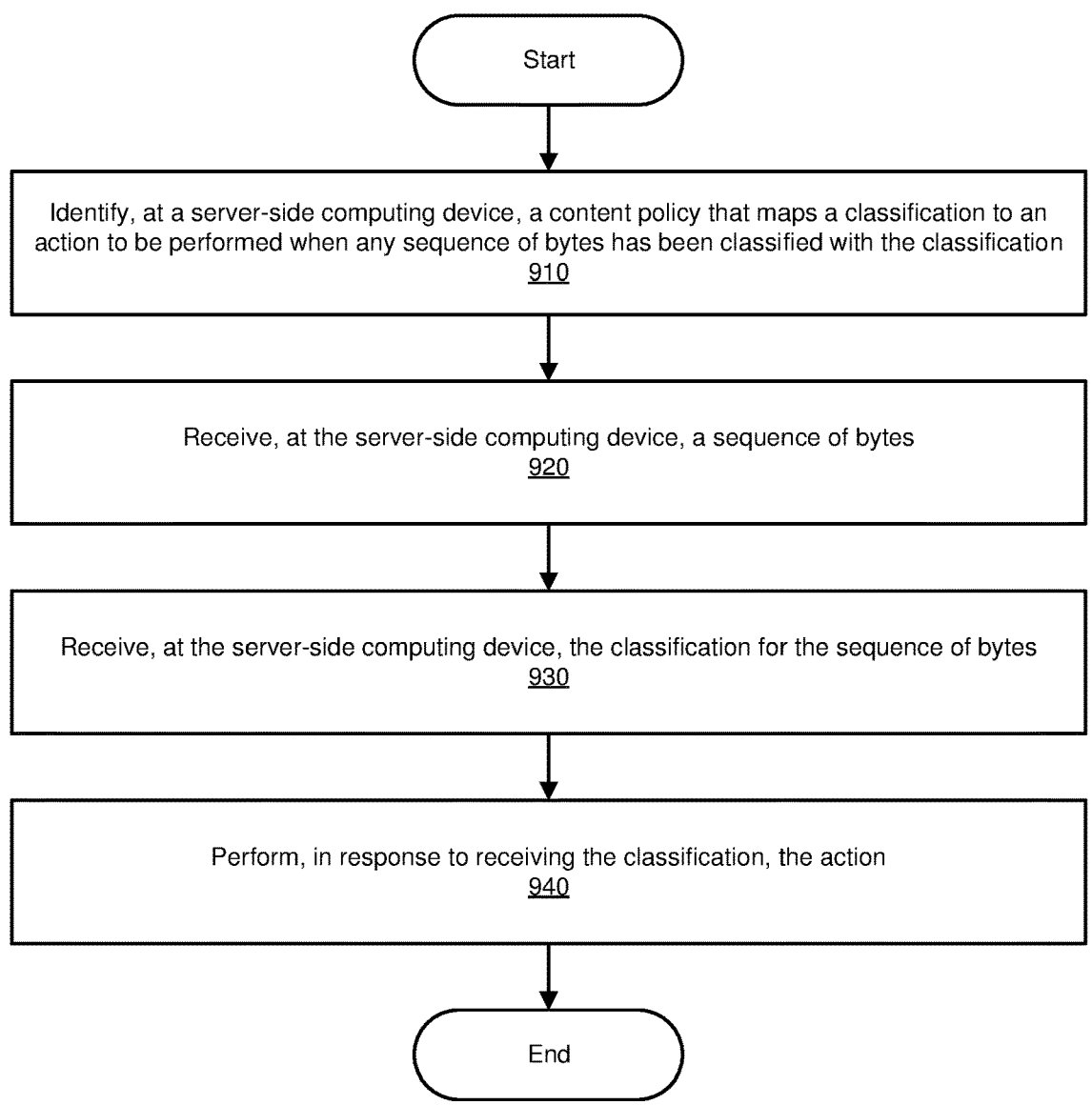
FIG. 9 is a flow diagram of an exemplary method for performing server-side actions in response to receiving content classifications.

The systems described herein may perform various real-time actions in response to how portions of a content item are classified. FIG. 9 is a flow diagram of an example computer-implemented method 900 for performing server-side actions in response to receiving content classifications. The steps shown in FIG. 9 may be performed by any suitable computer-executable code and/or computing system, including one or more of client computing device 126, analyst device 136, classifying device 138, and computing device 140 in FIG. 1. In one example, each of the steps shown in FIG. 9 may represent an algorithm whose structure includes and/or is represented by multiple sub-steps, examples of which will be provided in greater detail below.

At step 910, one or more of the systems described herein may identify, at a server-side computing device, a content policy that maps a classification (or a combination of classifications) to an action to be performed when any sequence of bytes has been classified with the classification (or the combination of classifications). Using FIG. 1 as an example, content-management module 128 may identify content policy 144.

In some examples, server-side content policies may indicate how a server-side device should process a content item received from a client-side computing device based on how various portions of the content item have been classified. For example, a server-side content policy may indicate that non-objectionable portions of a content item may be stored to a content store of an online system and/or distributed via the online system while also indicating that objectionable portions of the content item should not be stored to at the online system or distributed via the online system. In some examples, a server-side content policy may indicate where content items should be stored or processed at an online system based on how portions of the content items are classified. For example, a server-side content policy may indicate that portions of a content item that may be objectionable should be sent to computing devices that are monitored by human analysts and/or computing devices that perform additional content classification tasks or more stringent content filtering measures.

In some examples, a content policy may indicate that a specified action should be performed when a sequence of bytes of a content item has been assigned a particular classification or combination of classifications. For example, a content policy may indicate that the authorities (e.g., the police or other emergency services) should be immediately alerted when a sequence of bytes of a content item (e.g., a live video feed) has been assigned a classification indicating a dangerous weapon and/or a classification indicating a dangerous or emergency situation.

At step 920, one or more of the systems described herein may receive, at the server-side computing device, a sequence of bytes. Using FIG. 1 as an example, content-management module 128 may receive sequence of bytes 112(1) from client computing device 102. At step 930, one or more of the systems described herein may receive, at the server-side computing device, the classification for the sequence of bytes. Using FIG. 1 as an example, content-management module 128 may receive classification 120(1) from client computing device 102. At step 940, one or more of the systems described herein may perform, in response to receiving the classification, the action. Using FIG. 1 as an example, content-management module 128 may perform an action in response to receiving classification 120(1).

In general, the systems described herein may perform content-policy actions in real time and simultaneous with receiving content items. As such, real-time changes in how a client-side computing device classifies a content item may change how the content item is processed in real time by the server-side computing devices that receive the content item.

Figure 10:
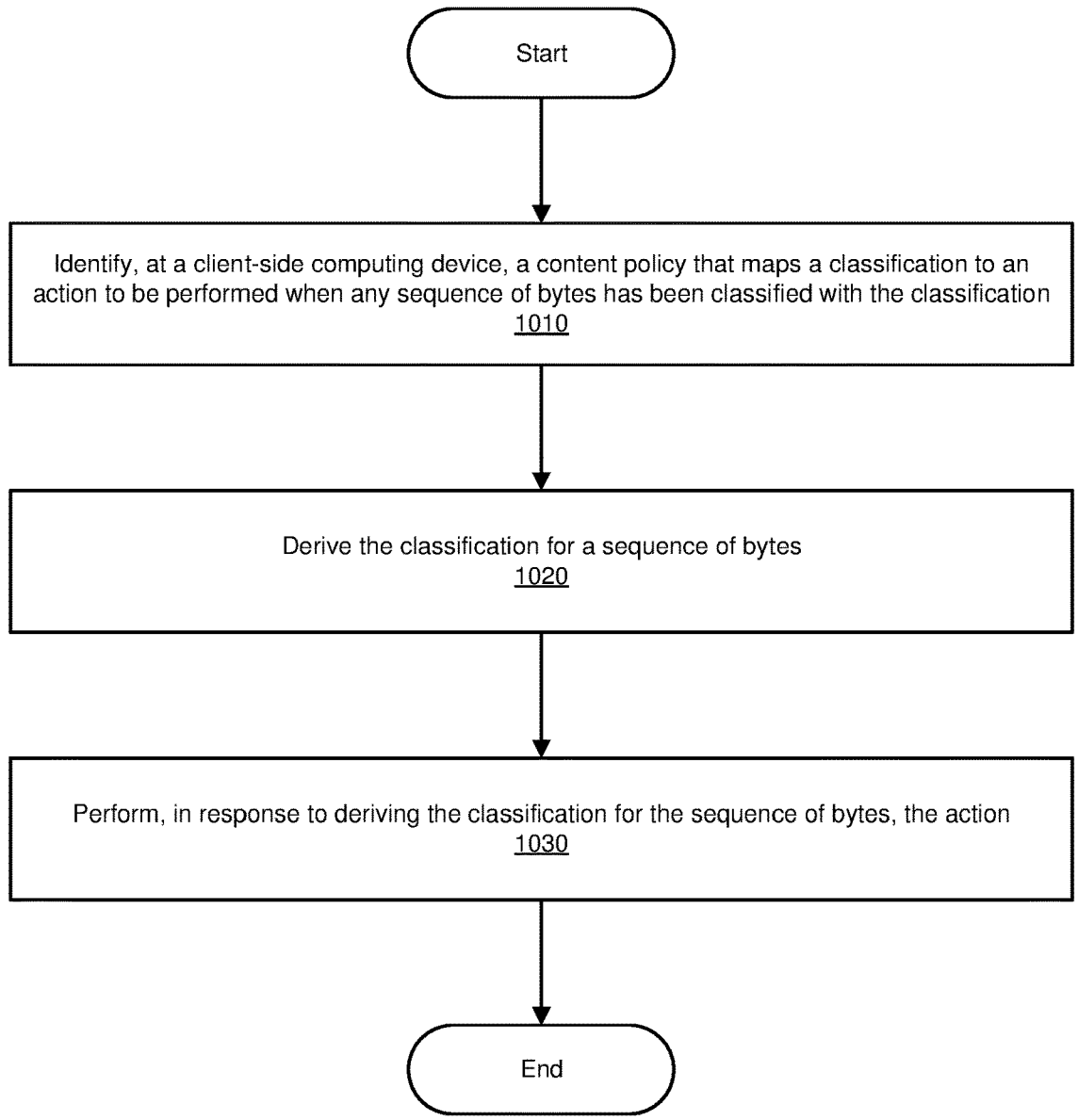
FIG. 10 is a flow diagram of an exemplary method for performing client-side actions in response to deriving content classifications.

FIG. 10 is a flow diagram of an example computer-implemented method 1000 for performing client-side actions in response to deriving content classifications. The steps shown in FIG. 10 may be performed by any suitable computer-executable code and/or computing system, including client computing device 102 in FIG. 1. In one example, each of the steps shown in FIG. 10 may represent an algorithm whose structure includes and/or is represented by multiple sub-steps, examples of which will be provided in greater detail below.

At step 1010, one or more of the systems described herein may identify, at a client-side computing device, a content policy that maps a classification (or a combination of classifications) to an action to be performed when any sequence of bytes has been classified with the classification (or the combination of classifications). At step 1020, one or more of the systems described herein may derive the classification for a sequence of bytes. Then at step 1030, one or more of the systems described herein may perform, in response to deriving the classification for the sequence of bytes, the action associated with the classification.

In some examples, client-side content policies may indicate how a client-side device should upload a content item to a server-side computing device based on how various portions of the content item are classified. For example, a content policy may indicate that non-objectionable portions of a content item may be uploaded to an online system for storage and/or distribution while also indicating that objectionable portions of a content item should not be uploaded to an online system for storage and/or distribution. In some examples, a content policy may indicate where content items should be uploaded based on how the content items are classified. For example, a content policy may indicate that portions of a content item that may be objectionable should be upload to server-side computing devices that are monitored by human analyst and/or server-side computing devices that perform additional content classification tasks or more stringent content filtering measures.

As described above, by classifying content on client-side devices rather than server-side devices, the systems and methods disclosed herein may reduce the amount of server-side resources needed to perform content classification. Moreover, by performing content classification as part of uploading or streaming content from client-side computing devices to server-side computing devices, the systems and methods disclosed herein may enable the server-side computing devices to receive the content and the content's classifications simultaneously, which may enable such things as real-time policing of content policies, real-time detection of objectionable content, and/or other real-time content-management tasks. In addition, the systems and methods described herein may improve the functioning of server-side computing devices by offloading classification tasks to client-side computing devices. These systems and methods may also improve the field of content hosting, especially live content hosting, by enabling server-side computing devices to receive classifications for content items simultaneously with receiving the content items themselves, which may enable the server-side computing devices to react immediately to the content items without needing to first classify the content items.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a sequence of bytes from a content item (e.g., one or more frames of a video stream) to be transformed, transform the sequence of bytes into a classification for the sequence of bytes, output a result of the transformation to a server-side computing device, use the result of the transformation at the server-side computing device to perform an action based on the classification of the sequence of bytes, and store the result of the transformation to a server-side classification store. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    receiving a request to upload a content item from a client-side computing device to one or more server-side computing devices, the content item comprising at least a first sequence of bytes and a second sequence of bytes;
    identifying, at the client-side computing device, at least one model configured to output one or more classifications for sequences of bytes in the content item;
    using, at the client-side computing device, the at least one model to derive a first classification for the first sequence;
    using, at the client-side computing device, the at least one model to derive a second classification for the second sequence; and
    uploading, in response to the request, the content item from the client-side computing device to the one or more server-side computing devices by:
        uploading the first sequence;
        uploading the first classification substantially contemporaneous with uploading the first sequence;
        uploading the second sequence; and
        uploading the second classification substantially contemporaneous with uploading the second sequence.

2. The method of claim 1, wherein the second sequence and the second classification are uploaded from the client-side computing device to the one or more server-side computing devices after the first sequence and the first classification are uploaded from the client-side computing device to the one or more server-side computing devices.

3. The method of claim 1, wherein:
    the content item comprises a video file recorded and stored at the client-side computing device;
    the first sequence comprises one or more frames of the video file; and
    the second sequence comprises one or more additional frames of the video file.

4. The method of claim 1, wherein:
    the content item comprises a live video stream being captured by and streamed from the client-side computing device;
    the first sequence comprises one or more frames of the live video stream; and
    the second sequence comprises one or more additional frames of the live video stream.

5. The method of claim 1, wherein the content item comprises at least one of:
    an audio file; or
    a live audio stream.

6. The method of claim 1, wherein:
    the first classification indicates that the first sequence contains objectionable content; and
    the second classification indicates that the second sequence does not contain objectionable content.

7. The method of claim 1, wherein:
    the first sequence and the second sequence are overlapping sequences;
    the first classification indicates that the first sequence contains an element of a known type; and
    the second classification indicates that the second sequence contains the element in an objectionable context.

8. The method of claim 1, further comprising:
    identifying, at the one or more server-side computing devices, a content policy that:
        maps the first classification to a first action to be performed when any sequence of bytes has been classified with the first classification; and
        maps the second classification to a second action to be performed when any sequence of bytes has been classified with the second classification;
    receiving, at the one or more server-side computing devices, the first sequence;
    receiving, at the one or more server-side computing devices, the first classification;
    performing, in response to receiving the first classification, the first action;
    receiving, at the one or more server-side computing devices, the second sequence;
    receiving, at the one or more server-side computing devices, the second classification; and
    performing, in response to receiving the second classification, the second action.

9. The method of claim 1, wherein uploading the first classification comprises:
    uploading a first indicator of the first classification substantially contemporaneous with uploading the first byte of the first sequence; and
    uploading a second indicator of the first classification substantially contemporaneous with uploading the last byte of the first sequence.

10. The method of claim 1, wherein:
    the content item further comprises a third sequence of bytes;

the method further comprises using, at the client-side computing device, the at least one model to derive a third classification for the third sequence; and uploading the content item from the client-side computing device to the one or more server-side computing devices further comprises refraining, at the client-side computing device based at least in part on the third classification of the third sequence, from uploading the third sequence to the one or more server-side computing devices.

11. The method of claim 1, further comprising identifying, at the client-side computing device, an upload policy that:
maps the first classification to a first action to be performed at the client-side computing device when any sequence of bytes has been classified with the first classification; and
maps the second classification to a second action to be performed at the client-side computing device when any sequence of bytes has been classified with the second classification.

12. The method of claim 11, wherein:
the first action comprises uploading any sequence of bytes that has been classified with the first classification to a first one of the one or more server-side computing devices; and
the second action comprises uploading any sequence of bytes that has been classified with the second classification to a second one of the one or more server-side computing devices.

13. A system comprising:
one or more server-side computing devices; and
a client-side software agent, stored in physical memory of a client-side computing device and executed by a physical processor of the client-side computing device, comprising:
a receiving module that receives a request to upload a content item from the client-side computing device to the one or more server-side computing devices, the content item comprising at least a first sequence of bytes and a second sequence of bytes;
an identifying module that identifies, at the client-side computing device, at least one model configured to output one or more classifications for sequences of bytes in the content item;
a classifying module that uses, at the client-side computing device, the at least one model to:
derive a first classification for the first sequence; and
derive a second classification for the second sequence; and
an uploading module that uploads, in response to the request, the content item from the client-side computing device to the one or more server-side computing devices by:
uploading the first sequence;
uploading the first classification substantially contemporaneous with uploading the first sequence;
uploading the second sequence; and
uploading the second classification substantially contemporaneous with uploading the second sequence.

14. The system of claim 13, wherein the uploading module uploads the second sequence and the second classification from the client-side computing device to the one or more server-side computing devices after uploading the first sequence and the first classification from the client-side computing device to the one or more server-side computing devices.

15. The system of claim 13, wherein the one or more server-side computing devices comprise a content-management module, stored in physical memory of the one or more server-side computing devices and executed by a physical processor of the one or more server-side computing devices, that:
identifies, at the one or more server-side computing devices, a content policy that:
maps the first classification to a first action to be performed when any sequence of bytes has been classified with the first classification; and
maps the second classification to a second action to be performed when any sequence of bytes has been classified with the second classification;
receives, at the one or more server-side computing devices, the first sequence;
receives, at the one or more server-side computing devices, the first classification;
performs, in response to receiving the first classification, the first action;
receives, at the one or more server-side computing devices, the second sequence;
receives, at the one or more server-side computing devices, the second classification; and
performs, in response to receiving the second classification, the second action.

16. The system of claim 15, wherein:
the first security action comprises transmitting any sequence of bytes that has been classified with the first classification to a first additional computing device; and
the second security action comprises transmitting any sequence of bytes that has been classified with the second classification to a second additional computing device.

17. The system of claim 13, wherein the uploading module uploads the first classification from the client-side computing device to the one or more server-side computing devices by:
uploading a first indicator of the first classification substantially contemporaneous with uploading the first byte of the first sequence; and
uploading a second indicator of the first classification substantially contemporaneous with uploading the last byte of the first sequence.

18. The system of claim 13, wherein:
the content item further comprises a third sequence of bytes;
the classifying module further uses, at the client-side computing device, the at least one model to derive a third classification for the third sequence; and
the uploading module uploads the content item from the client-side computing device to the one or more server-side computing devices by refraining, at the client-side computing device based at least in part on the third classification of the third sequence, from uploading the third sequence to the one or more server-side computing devices.

19. The system of claim 13, wherein:
the first sequence and the second sequence are overlapping sequences;
the first classification indicates that the first sequence contains an element of a known type; and
the second classification indicates that the second sequence contains the element in an objectionable context;
the uploading module uploads the first classification and the second classification by:

uploading a first indicator of the first classification substantially contemporaneous with uploading the first byte of the first sequence;

uploading a second indicator of the second classification substantially contemporaneous with uploading the first byte of the second sequence;

uploading a third indicator of the first classification substantially contemporaneous with uploading the last byte of the first sequence; and uploading a fourth indicator of the second classification substantially contemporaneous with uploading the last byte of the second sequence.

20. A non-transitory computer-readable medium comprising one or more computer-readable instructions that, when executed by at least one processor of a client-side computing device, cause the client-side computing device to:

receive a request to upload a content item from the client-side computing device to one or more server-side computing devices, the content item comprising at least a first sequence of bytes and a second sequence of bytes;

identify, at the client-side computing device, at least one model configured to output one or more classifications for sequences of bytes in the content item;

use, at the client-side computing device, the at least one model to derive a first classification for the first sequence;

use, at the client-side computing device, the at least one model to derive a second classification for the second sequence; and upload, in response to the request, the content item from the client-side computing device to the one or more server-side computing devices by:

uploading the first sequence;

uploading the first classification substantially contemporaneous with uploading the first sequence;

uploading the second sequence; and uploading the second classification substantially contemporaneous with uploading the second sequence.

* * * * *